United States Patent
Duffy et al.

(10) Patent No.: US 7,618,687 B2
(45) Date of Patent: Nov. 17, 2009

(54) METHOD FOR COATING SUBSTRATES

(75) Inventors: Shawn P. Duffy, Cheswick, PA (US); Jeffrey S. Warzynski, Cranberry Township, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 57 days.

(21) Appl. No.: 11/873,737

(22) Filed: Oct. 17, 2007

(65) Prior Publication Data

US 2009/0104372 A1  Apr. 23, 2009

(51) Int. Cl.
*B05D 3/00* (2006.01)
(52) U.S. Cl. .................... 427/553; 427/180; 118/667; 118/723 R; 118/724
(58) Field of Classification Search ............... 427/553; 118/313, 314, 323, 324, 667, 723 R, 724
See application file for complete search history.

(56) References Cited

U.S. PATENT DOCUMENTS

| 4,044,175 A | 8/1977 | Coxon |
| 4,290,383 A | 9/1981 | Pfender |
| 6,746,535 B2 | 6/2004 | Hasenour et al. ............ 118/313 |
| 7,470,225 B2 * | 12/2008 | Herrin ..................... 493/126 |
| 2002/0033134 A1 | 3/2002 | Fannon ..................... 118/667 |
| 2003/0176527 A1 * | 9/2003 | Votteler et al. ............. 522/113 |
| 2006/0029730 A1 | 2/2006 | Campbell et al. ........... 427/180 |
| 2006/0029791 A1 | 2/2006 | Campbell et al. ........... 428/323 |
| 2006/0030634 A1 | 2/2006 | Dean et al. ................. 522/103 |

FOREIGN PATENT DOCUMENTS

| DE | 202004003531 U1 | 6/2004 |
| EP | 0453751 | 10/1991 |

* cited by examiner

*Primary Examiner*—Michael Kornakov
*Assistant Examiner*—Xiao Zhao
(74) *Attorney, Agent, or Firm*—Donald R. Palladino

(57) ABSTRACT

Disclosed are methods for coating a substrate. These methods include: (a) vertically orienting the substrate between a vertically oriented backstop and a spray gun; (b) at least partially coating the vertically oriented substrate with a substantially 100% solids, radiation curable liquid coating composition by passing the composition through the spray gun wherein the composition is atomized; whereby a portion of the atomized coating composition deposits on the vertically oriented substrate and a portion of the atomized coating composition deposits on the vertically oriented backstop; (c) exposing the coated substrate to ionizing radiation and/or actinic radiation to cure the coating composition deposited thereon; and (d) removing and reusing at least a portion of the coating composition deposited on the vertically oriented backstop. Related coating systems are also disclosed.

15 Claims, 1 Drawing Sheet

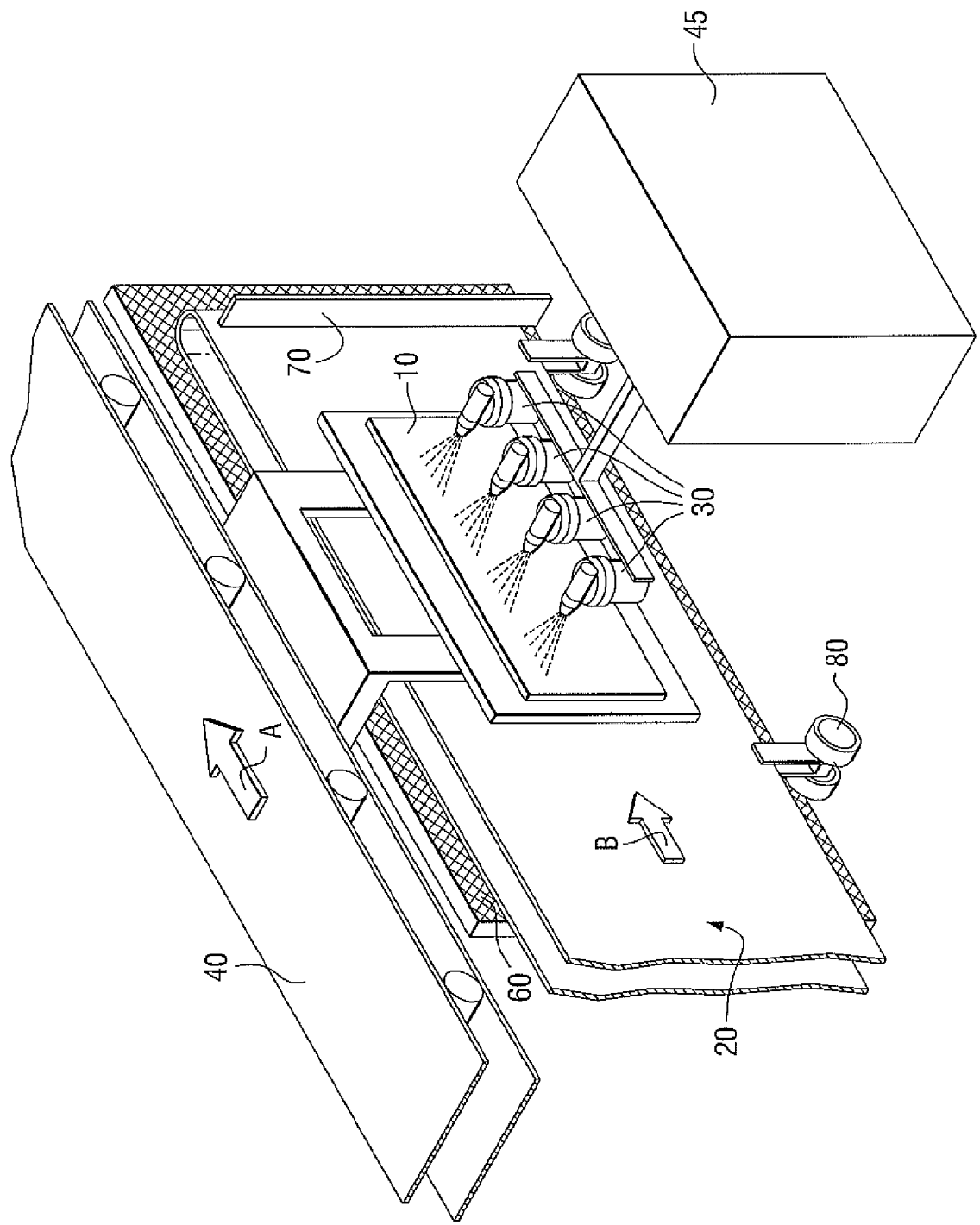

METHOD FOR COATING SUBSTRATES

FIELD OF THE INVENTION

The present invention is directed to methods and apparatus for coating a substrate.

BACKGROUND OF THE INVENTION

Articles containing wood surfaces, such as furniture and cabinets, are often coated with one or more coatings. To provide color to such surfaces, toners and stains containing dyes and/or pigments are often used. Other surface layers, such as sealers and topcoats, may be used alone or in addition to such coloring layers. Typically, a sealer is applied either directly over the wood surface if no coloring layers are present, or, if a toner and/or stain is used, directly over such layers. A topcoat, if used, is typically applied over the sealer layer.

Coating compositions that are radiation curable are often desired, particularly for wood finish applications. Radiation curable coatings, such as those cured by exposure to ultraviolet ("UV") radiation, are often desirable in wood finish applications because of the heat sensitivity of wood, which often makes certain thermosetting coatings undesirable. Acrylated resins are radiation curable and are often used in wood finish coatings.

Coatings that are essentially solvent-free are often desired because solvents, particularly organic solvents, can be costly, hazardous, and environmentally unfriendly. The presence of significant amounts of organic solvents in spray-applied coatings may be particularly undesirable for health and environmental reasons. Coatings that contain water or organic solvents can also be inefficient and costly, because these diluents must typically be evaporated from the coating before curing is complete.

Sprayable coatings are also often desired. Sprayability is often particularly desirable when the article to be coated is irregularly shaped, since it can be difficult to effectively coat such articles by other methods, such as roll coating. A sprayable coating is a coating that can be applied uniformly by atomization through a device, such as a spray gun, and is a function of the rheology profile of the coating. Generally, a coating composition with a viscosity of 2 to 300 cps at 25° C. (77° F.) is considered to be sprayable. Historically, solvents, such as water or organic solvents, have been required to attain such viscosities in radiation curable coatings. More recently, however, reactive diluents, such as relatively low molecular weight acrylate monomers, especially monofunctional acrylate monomers, have been used to achieve sprayability.

Historically, sealers and topcoats have been applied to wood surfaces by spray or roll on application of the coating to horizontally oriented wood substrates that is arranged on a conveyer system. An example of such a system is depicted in U.S. Pat. No. 6,746,535. In such an arrangement, the coating is deposited on one side of the article and then cured. Thereafter, if it is necessary to coat the other side of the article, the article is flipped and the process is repeated. As is apparent, such a process can be cumbersome.

As a result, it would be desirable to provide improved methods for coating substrates utilizing recyclable, substantially 100% solids, radiation curable coating compositions.

SUMMARY OF THE INVENTION

In certain respects, the present invention is directed to methods for coating a substrate. These methods comprise: (a) vertically orienting the substrate between a vertically oriented backstop and a spray gun; (b) at least partially coating the vertically oriented substrate with a substantially 100% solids, radiation curable liquid coating composition by passing the composition through the spray gun wherein the composition is atomized; whereby a portion of the atomized coating composition deposits on the vertically oriented substrate and a portion of the atomized coating composition deposits on the vertically oriented backstop; (c) exposing the coated substrate to ionizing radiation and/or actinic radiation to cure the coating composition deposited thereon; and (d) removing and reusing at least a portion of the coating composition deposited on the vertically oriented backstop.

In other respects, the present invention is directed to systems for coating a substrate. The system comprises: (a) a vertically oriented substrate disposed between a vertically oriented backstop and a spray gun; (b) a substantially 100% solids, radiation curable liquid coating composition in communication with the spray gun such that the coating composition passes through the spray gun wherein the composition is atomized; whereby upon atomization a portion of the atomized coating composition deposits on the vertically oriented substrate and a portion of the atomized coating composition deposits on the vertically oriented backstop; (c) means for exposing the coated substrate to ionizing radiation and/or actinic radiation to cure the coating composition deposited thereon; and (d) means for removing and reusing at least a portion of the coating composition deposited on the vertically oriented backstop.

BRIEF DESCRIPTION OF THE DRAWINGS

FIG. 1 is a perspective view of a system for coating a substrate in accordance with certain embodiments of the present invention.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As previously mentioned, certain embodiments of the present invention are directed to methods for coating a substrate. Suitable substrates include cellulosic-containing materials, including paper, paperboard, cardboard, plywood and pressed fiber boards, hardwood, softwood, wood veneer, particleboard, chipboard, oriented strand board, and fiberboard. Such materials may be made entirely of wood, such as pine, oak, maple, mahogany, cherry, and the like. In some cases, however, the materials may comprise wood in combination with another material, such as a resinous material, i.e., wood/resin composites, such as phenolic composites, composites of wood fibers and thermoplastic polymers, and wood composites reinforced with cement, fibers, or plastic cladding. In certain embodiments, such a substrate has been coated or treated with a wood stain and or toner prior to application of the compositions of the present invention.

Suitable metallic substrates include, but are not limited to, foils, sheets, or workpieces constructed of cold rolled steel, stainless steel and steel surface-treated with any of zinc metal, zinc compounds and zinc alloys (including electrogalvanized steel, hot-dipped galvanized steel, GALVANNEAL steel, and steel plated with zinc alloy), copper, magnesium, and alloys thereof, aluminum alloys, zinc-aluminum alloys such as GALFAN, GALVALUME, aluminum plated steel and aluminum alloy plated steel substrates may also be used. Steel substrates (such as cold rolled steel or any of the steel substrates listed above) coated with a weldable, zinc-rich or iron phosphide-rich organic coating are also suitable for use in the process of the present invention. Such weldable coating compositions are disclosed in U.S. Pat. Nos. 4,157,924 and 4,186,036. Cold rolled steel is also suitable when pretreated with, for example, a solution selected from the group consisting of a metal phosphate solution, an aqueous solution containing at least one Group IIIB or IVB metal, an organophosphate solution, an organophosphonate solution, and combinations thereof. Also, suitable metallic substrates include silver, gold, and alloys thereof.

Examples of suitable silicatic substrates are glass, porcelain and ceramics.

Examples of suitable polymeric substrates are polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers and block copolymers, biodegradable polymers and natural polymers—such as gelatin.

Examples of suitable textile substrates are fibers, yarns, threads, knits, wovens, nonwovens and garments composed of polyester, modified polyester, polyester blend fabrics, nylon, cotton, cotton blend fabrics, jute, flax, hemp and ramie, viscose, wool, silk, polyamide, polyamide blend fabrics, polyacrylonitrile, triacetate, acetate, polycarbonate, polypropylene, polyvinyl chloride, polyester microfibers and glass fiber fabric.

Examples of suitable leather substrates are grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also woolen skins and furs (e.g. fur-bearing suede leather). The leather may have been tanned by any conventional tanning method, in particular vegetable, mineral, synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents, e.g., chromium, zirconyl or aluminium derivatives, quebracho, chestnut or mimosa extracts, aromatic syntans, polyurethanes, (co)polymers of (meth) acrylic acid compounds or melamine/, dicyanodiamide/and/ or urea/formaldehyde resins.

Examples of suitable compressible substrates include foam substrates, polymeric bladders filled with liquid, polymeric bladders filled with air and/or gas, and/or polymeric bladders filled with plasma. As used herein the term "foam substrate" means a polymeric or natural material that comprises a open cell foam and/or closed cell foam. As used herein, the term "open cell foam" means that the foam comprises a plurality of interconnected air chambers. As used herein, the term "closed cell foam" means that the foam comprises a series of discrete closed pores. Example foam substrates include polystyrene foams, polymethacrylimide foams, polyvinylchloride foams, polyurethane foams, polypropylene foams, polyethylene foams, and polyolefinic foams. Example polyolefinic foams include polypropylene foams, polyethylene foams and/or ethylene vinyl acetate (EVA) foam. EVA foam can include flat sheets or slabs or molded EVA forms, such as shoe midsoles. Different types of EVA foam can have different types of surface porosity. Molded EVA can comprise a dense surface or "skin", whereas flat sheets or slabs can exhibit a porous surface.

The methods of the present invention comprise vertically orienting the substrate between a vertically oriented backstop and a spray gun As used herein, the term "vertically orienting" means that the substrate surface to be coated is oriented more vertically than horizontally, i.e., it has a generally up/down profile as opposed to a lateral profile. In certain embodiments, "vertically orienting" means orienting the substrate surface to be coated so as to form an angle with the horizontal of between 85 and 95 degrees, such as 87.5 and 92.5 degrees.

As used herein, the term "backstop" refers to any structural element that is employed to stop further advancement of the portion of the coating composition emitted from the spray gun that does not deposit on the vertically oriented substrate.

Any of the spray guns known to those of skill in the art may be utilized in the methods of the present invention, including, for example, air assisted, airless, and high velocity low pressure (HVLP) spray guns.

According to the methods of the present invention, the vertically oriented substrate is at least partially coated with a substantially 100% solids, radiation curable liquid coating composition. As used herein, the term "substantially 100% solids" means that the composition is embodied as a liquid coating composition that is substantially solvent-free and water-free. In other words, the coating composition contains substantially no volatile organic solvent ("VOC"), and has essentially zero emissions of VOC, and contains substantially no water. In certain embodiments, the substantially 100% solids coatings of the present invention comprise less than 5 percent VOC and water by weight of the coating composition, in some cases less than 2 percent by weight of the coating composition, in yet other cases, less than 1 percent by weight of the coating composition, and, in yet other cases, VOC and water are not present in the coating composition at all.

The liquid coating compositions used in the methods of the present invention are recyclable. As used herein, the term "recyclable" refers to a composition that remains homogenous after spraying and can be re-sprayed after recirculation while maintaining performance properties, such as resistance to mar, toughness, and intercoat adhesion. For example, in certain embodiments, the liquid coating compositions used in the methods of the present invention exhibit a weight loss as measured by thermogravimetric analysis (TGA) of less than 10% or, in some cases, less than 7% or, in yet other cases, less than 2%, at 120° F. (49° C.) for 12 hours. The TGA weight losses reported herein can be determined in a manner that would be understood by those skilled in the art and are intended to simulate spray and recirculation temperatures for certain spray application conditions.

Moreover, in certain embodiments, the liquid coating compositions used in the methods of the present invention exhibit a weight loss of less than 4% or, in some cases, less than 2%, or in yet other cases, less than 1%, as measured by ASTM D5403 Method A, which is specified to simulate potential weight loss of a UV curable coating during UV cure and subsequent finished product aging.

The liquid coating compositions used in the methods of the present invention are radiation curable. As used herein, the term "radiation curable" refers to compositions that comprise reactive components that are polymerizable by exposure to ionizing radiation and/or actinic radiation, as described in more detail below.

As a result, the coating compositions utilized in certain methods of the present invention comprise materials that are curable upon exposure to actinic radiation, such as compounds with radiation-curable functional groups, which include, for example, unsaturated groups, including vinyl groups, vinyl ether groups, epoxy groups, maleimide groups, fumarate groups and combinations of the foregoing. In certain embodiments, the radiation curable groups are curable upon exposure to ultraviolet radiation and can include, for example, acrylate groups, maleimides, fumarates, and vinyl ethers. Suitable vinyl groups include those having unsaturated ester groups and vinyl ether groups.

In certain embodiments, the radiation curable compositions used in the methods of the present invention comprise a mixture of: (a) an acrylated epoxy, and (b) a multi-functional acrylate and, in certain embodiments, (c) a photoinitiator. In certain embodiments, the radiation curable compositions used in the methods of the present invention comprise a material containing an amino group.

In certain embodiments, the compositions used in the methods of the present invention are substantially free of monofunctional reactive diluents, such as monofunctional acrylate monomers. The recyclability of the coating compositions used in the methods of the present invention is believe to be at least partly due to the absence of significant amounts of monofunctional reactive diluent. Indeed, it is believed that monofunctional acrylate monomers not only react into and become part of the coating during cure, but they also evaporate during cure to a greater extent than multi-functional acrylates.

Acrylated epoxies are produced through reaction of epoxy resins with (meth)acrylic acids. As used herein, "(meth) acrylic" and terms derived therefrom are intended to include both acrylic and methacrylic. In certain embodiments, the liquid compositions utilized in the methods of the present invention comprise an acrylated epoxy that has a viscosity at 25° C. (77° F.) of less than 10,000 centipoise, or, in some cases, less than 5,000 centipoise, or, in other cases, about 1,000 centipoise. In certain embodiments, the acrylated epoxy has a Tg (glass transition temperature) of less than 50° C. (122° F.), or, in some cases, less than 25° C. (77° F.) or, in still other cases, less than 0° C. (32° F.), or, in yet other cases, less than −10° C. (14° F.).

Suitable acrylated epoxies that may be used in the methods of the present invention include, without limitation, those which are the reaction product of compounds having at least one epoxide group with compounds having per molecule at least one α,β-ethylenically unsaturated double bond and at least one group which is reactive toward epoxide groups. In certain embodiments, the acrylated epoxy may comprise a multi-functional acrylated epoxy. As used herein, the term "multi-functional acrylated epoxy" refers to acrylated epoxies having an acrylate functionality of greater than 1.0.

Some specific examples of commercially available acrylated epoxies that are suitable for use in the compositions used in the methods of the present invention include, without limitation, EBECRYL 3200, 3201, 3211 and 3212, available from UCB Chemicals Corporation, Smyrna, Ga.; PHOTOMER 4025, available from Cognis Corp., Cincinnati, Ohio; LAROMER 8765, available from BASF Corp., Charlotte, N.C.; and CN115, available from Sartomer Corp., Exton, Pa.

In certain embodiments, the composition used in the methods of the present invention comprises at least 10 percent by weight of acrylated epoxy or, in some embodiments, at least 15 percent by weight of acrylated epoxy or, in yet other cases, 20 percent by weight up to 80 percent by weight, or, in still other embodiments, from 35 up to 65 percent by weight of acrylated epoxy based on the total weight of the radiation curable composition. In certain embodiments, the composition comprises 10 up to 30 percent by weight of acrylated epoxy based on the total weight of the coating composition. The amount of acrylated epoxy present in the coating compositions can range between any combination of these values inclusive of the recited values.

In certain embodiments, the coating compositions utilized in the methods of the present invention comprise a multi-functional acrylate. As used herein, the term "multi-functional acrylate" refers to compounds having an acrylate functionality of greater than 1.0, such as at least 2.0. Multifunctional acrylates suitable for use in the present invention include, for example, those that have a relative molar mass of from 170 to 5000 grams per mole, such as 170 to 1500 grams per mole.

Multi-functional acrylates suitable for use in the coating compositions used in the methods of the present invention include, without limitation, difunctional, trifunctional, tetrafunctional, pentafunctional, hexafunctional (meth)acrylates and mixtures thereof. As used herein, "(meth)acrylate" and terms derived therefrom are intended to include both acrylates and methacrylates.

Representative examples of suitable multi-functional acrylates include, without limitation, ethylene glycol di(meth)acrylate, 1,3-butylene glycol di(meth)acrylate, 1,4-butanediol diacrylate, 2,3-dimethylpropane 1,3-diacrylate, 1,6-hexanediol di(meth)acrylate, dipropylene glycol diacrylate, ethoxylated hexanediol di(meth)acrylate, propoxylated hexanediol di(meth)acrylate, neopentyl glycol di(meth)acrylate, alkoxylated neopentyl glycol di(meth)acrylate, hexylene glycol di(meth)acrylate, diethylene glycol di(meth)acrylate, tripropylene glycol di(meth)acrylate, thiodiethylene glycol diacrylate, trimethylene glycol dimethacrylate, pentaerythritol tri(meth)acrylate, trimethylolpropane tri(meth)acrylate, ditrimethylolpropane tetra(meth)acrylate, glycerolpropoxy tri(meth)acrylate, ethoxylated trimethylolpropane tri(meth)acrylate, and tetraethylene glycol di(meth)acrylate, including mixtures thereof.

In certain embodiments, the coating compositions used in the methods of the present invention comprise less than 90 percent by weight of multifunctional acrylate or, in some embodiments, less than 85 percent by weight or, in yet other embodiments, more than 20 percent by weight up to less than 80 percent by weight, or, in still other embodiments, from 35 up to 65 percent by weight of multifunctional acrylate based on the total weight of the coating composition. The amount of multifunctional acrylate present in the coating composition can range between any combination of these values inclusive of the recited values.

In certain embodiments, particularly when the coating composition is to be cured by UV radiation, the composition also comprises a photoinitiator. As will be appreciated by those skilled in the art, a photoinitiator absorbs radiation during cure and transforms it into chemical energy available for the polymerization. Photoinitiators are classified in two major groups based upon a mode of action, either or both of which may be used in the compositions of the present invention. Cleavage-type photoinitiators include acetophenones, α-aminoalkylphenones, benzoin ethers, benzoyl oximes, acylphosphine oxides and bisacylphosphine oxides and mixtures thereof. Abstraction-type photoinitiators include benzophenone, Michler's ketone, thioxanthone, anthraquinone, camphorquinone, fluorone, ketocoumarin and mixtures thereof.

Specific nonlimiting examples of photoinitiators that may be used include benzil, benzoin, benzoin methyl ether, benzoin isobutyl ether benzophenol, acetophenone, benzophenone, 4,4'-dichlorobenzophenone, 4,4'-bis(N,N'-dimethylamino)benzophenone, diethoxyacetophenone, fluorones, e.g., the H-Nu series of initiators available from Spectra Group Ltd., 2-hydroxy-2-methyl-1-phenylpropan-1-one, 1-hydroxycyclohexyl phenyl ketone, 2-isopropylthixantone, α-aminoalkylphenone, e.g., 2-benzyl-2-dimethylamino-1-(4-morpholinophenyl)-1-butanone, acylphosphine oxides, e.g., 2,6-dimethylbenzoyldlphenyl phosphine oxide, 2,4,6-trimethylbenzoyldiphenylphosphine oxide, bis(2,4,6-trimethylbenzoyl)phenyl phosphine oxide, 2,6-dichlorobenzoyl-diphenylphosphine oxide, and 2,6-dimethoxybenzoyldiphenylphosphine oxide, bisacylphosphine oxides, e.g., bis(2,6-dimethyoxybenzoyl)-2,4,4-trimethylepentylphosphine oxide, bis(2,6-dimethylbenzoyl)-2,4,4-trimethylpentylphosphine oxide, bis(2,4,6-trimethylbenzoyl)-2,4,4-trimethylpentylphosphine oxide, and bis(2,6-dichlorobenzoyl)-2,4,4-trimethylpentylphosphine oxide, and mixtures thereof.

In certain embodiments, the coating compositions comprise 0.01 up to 15 percent by weight of photoinitiator or, in some embodiments, 0.01 up to 10 percent by weight, or, in yet other embodiments, 0.01 up to 5 percent by weight of photoinitiator based on the total weight of the coating composition. The amount of photoinitiator present in the coating composition can range between any combination of these values inclusive of the recited values.

In certain embodiments, the coating compositions utilized in the methods of the present invention also comprise a material containing an amino group, whether as part of the acrylated epoxy described earlier, as part of a multi-functional acrylate described earlier, or as a separate component of the composition.

In certain embodiments, the coating composition utilized in the methods of the present invention comprise an amine modified (meth)acrylate. Amine modified (meth)acrylates suitable for use in the present invention are known in the art and include, without limitation, amine modified polyether acrylates, amine modified polyester acrylates, amine modified epoxy acrylates, and amine modified urethane acrylates, including mixtures thereof.

Representative specific examples of commercially available amine modified (meth)acrylates suitable for use in the present invention include, without limitation, the LAROMER line of amine-modified acrylates available from BASF Corporation, Charlotte, N.C., such as LAROMER PO77F, PO94F, and LR8996; CN501, CN502, CN550, and CN551 available from Sartomer Corp., Exton, Pa.; and ACTILANE 525, 584, and 587 available from Akcros Chemicals, New Brunswick, N.J.

In certain embodiments, the coating composition utilized in the methods of the present invention comprises at least 5 percent by weight, or, in some cases, at least 10 percent by weight, or, in yet other cases, at least 20 percent by weight of a material containing an amino group based on the total weight of the coating composition. In some embodiments, the coating composition comprises 5 up to 50 percent by weight or, in other cases, 10 up to 30 percent by weight of a material containing an amino group based on the total weight of the coating composition. The amount of the material containing an amino group present in the coating composition can range between any combination of these values inclusive of the recited values.

As previously indicated, in certain embodiments, the compositions utilized in the methods of the present invention are substantially free of monofunctional reactive diluents (such as monofunctional acrylate monomers). As used herein, "substantially free", when used in this context, means that monofunctional reactive diluents are present in the composition, if at all, as an incidental impurity. In other words, they are not intentionally added to the composition, but may be present at minor or inconsequential levels, because it was carried over as an impurity as part of an intended composition component. In some embodiments, the compositions are completely free of monofunctional reactive diluents.

In certain embodiments, the coating compositions used in the methods of the present invention comprise a rheology modifier. A number of rheology modifiers, either alone or in combination, may be used to produce compositions suitable for use in the methods of the present invention. For example, suitable rheology modifiers include, without limitation, fumed silicas, organo-clays, modified ureas, nano-aluminum oxide, non-associate thickeners, and mixtures thereof, among others. A suitable rheology modifier that is commercially available and that may be used is a modified lower molecular weight polymeric urea available from BYK-Chemie USA, Wallingford, Conn. sold under the name BYK-410. In certain embodiments, the rheology modifier promotes the recyclability of the coating composition.

In certain embodiments, the coating compositions used in the methods of the present invention comprise 0.01 up to 5 percent by weight of rheology modifier, in some embodiments, 0.1 up to 2 percent by weight, or, in yet other embodiments, 0.1 up to 1 percent by weight of rheology modifier. The amount of rheology modifier present in the coating compositions can range between any combination of these values inclusive of the recited values.

In certain embodiments, the coating compositions used in the methods of the present invention comprise one or more suitable surfactants to reduce surface tension. Surfactants include materials otherwise known as wetting agents, antifoaming agents, emulsifiers, dispersing agents, leveling agents etc. Surfactants can be anionic, cationic and nonionic, and many surfactants of each type are available commercially. Some coating compositions include at least a wetting agent. Still other coating compositions may have additional surfactants to perform additional effects. Some specific wetting agents that may be employed in the radiation curable compositions of the present invention include siloxane-based, Silwet® L-77 wetting agent, available from OSI Specialties, Inc., the BYK®-306 wetting/leveling agent available from BYK Chemie, and the Dow Corning #57 flow control agent available from Dow Corning, among others.

Other suitable surfactants may also be selected. The amount and number of surfactants added to the coating compositions will depend on the particular surfactant(s) selected, but should be limited to the minimum amount of surfactant that is necessary to achieve wetting of the substrate while not compromising the performance of the dried coating. In certain embodiments, the coating compositions comprise 0.01 up to 10 percent by weight of surfactant, in some embodiments, 0.05 up to 5 percent by weight, or, in yet other embodiments, 0.1 up to 3 percent by weight of surfactant. The amount of surfactant present in the coating compositions can range between any combination of these values inclusive of the recited values.

In certain embodiments, the coating compositions used in the methods of the present invention comprise a UV-light stabilizer, such as, for example, a suitable hindered-amine or a UV absorber, such as substituted benzotriazole or triazine. Any of a number of such materials may be used. For example, suitable UV-light stabilizers include a hindered-amine sold under the name TINUVIN 292 and UV absorbers sold under the names TINUVIN 328 and TINUVIN 400, all of which are available from Ciba Specialty Chemicals.

In certain embodiments, the coating compositions comprise 0.01 up to 10 percent by weight of UV-light stabilizer and/or UV absorber, in some embodiments, 0.01 up to 5 percent by weight, or, in yet other embodiments, 0.01 up to 2.5 percent by weight of UV-light stabilizer and/or UV absorber. The amount of UV-light stabilizer and/or UV absorber present in the coating compositions can range between any combination of these values inclusive of the recited values.

The coating compositions used in the methods of the present invention may also include other additives, such as, for example, dyes, pigments, sanding additives, antioxidants, and flatting agents (e.g. wax-coated or non-wax coated silica or other inorganic materials), among other materials.

As previously indicated, in the methods of the present invention the coating composition is passed through a spray gun wherein the composition is atomized. As a result, the coating compositions utilized in the methods of the present invention are sprayable. As used herein, the term "sprayable" refers to compositions that are capable of being applied uniformly by atomization through a device such as a spray gun. Sprayability, as will be appreciated by those skilled in the art, is a function of the viscosity of a material. In certain embodiments, the compositions used in the methods of the present invention have a viscosity of from 2 to 300 centipoise or, in other embodiments, from 20 to 150 centipoise, or, in yet other embodiments, 20 to 120 centipoise, at high shear at 25° C. (77° F.). The viscosities reported herein may be determined using a Cone and Plate viscometer at 5000 cycles per second as understood by those skilled in the art.

In the methods of the present invention a portion of the atomized coating composition that exits the spray gun deposits on the vertically oriented substrate and a portion of the atomized coating composition that exits from the spray gun deposits on the vertically oriented backstop.

According to the methods of the present invention, the coated substrate is, as described in more detail below, exposed to ionizing radiation or actinic radiation to cure the coating composition deposited thereon.

According to the methods of the present invention, at least a portion of the coating composition deposited on the vertically oriented backstop is removed and reused. By "reused" is meant that at least a portion of the coating composition removed from the vertically oriented backstop is subsequently used to coat a substrate using a method of the present invention.

Now referring to FIG. 1, there is depicted a system for coating a substrate according to certain embodiments of the present invention, which also further illustrates the methods of the present invention. As is apparent, the system may be embodied as a system for coating a continuously advancing vertically oriented article 10, such as a wood cabinet door or other article, which, in FIG. 1, is advanced in the direction of arrow "A". As is apparent, the vertically oriented article 10 is disposed between a vertically oriented backstop 20 and, in this embodiment, a plurality of horizontally oriented spray guns 30. As used herein, "horizontally oriented" means that the spray gun nozzle from which the coating composition exits the spray gun forms an angle with the vertical of between 85 and 95 degrees, such as 87.5 and 92.5 degrees.

In the embodiment depicted in FIG. 1, the vertically oriented article 10 is hung from an endless overhead conveyer 40, which transports the article 10 past the spray guns 30 and into and through a subsequently disposed radiation cure oven (not shown). In certain embodiments, the endless overhead conveyer moves at a speed of 10 to 100 feet per minute to provide varying thicknesses of the coating.

In certain embodiments, as depicted in FIG. 1, the spray guns 30 are mounted on a reciprocating element 45. In certain embodiments, the reciprocating element is a vertical reciprocator that moves the spray guns 30 in an up-and-down vertical motion as the vertically oriented article 10 moves by.

As indicated, the vertical oriented article 10 is disposed between the spray guns 30 and a backstop 20. As the article 10 moves in the direction of arrow A past the spray guns 30, the spray guns 30 emit a coating composition of the type previously described. In the methods and apparatus of the present invention, some of the emitting coating composition deposits on article 10, whereas some of the emitted coating composition misses article 10 and, instead, is deposited on backstop 20. At least some of the coating composition that is deposited on backstop 20 is removed from backstop 20 and reused, as previously stated.

In certain embodiments, backstop 20 is an endless conveyer that, in certain embodiments, travels in general direction of arrow "B". Moreover, the backstop 20 may be portable, as is depicted in FIG. 1, wherein the backstop is shown mounted on wheels 80. In addition, in certain embodiments, an air filter 60 is disposed behind the backstop 20 to capture extremely fine overspray from the spray guns 30 that fails to deposit on either the vertically oriented article 10 or the backstop 20.

Any means may be used to remove the coating composition from the backstop. In certain embodiments, a belt scraper 70 is generally vertically disposed on the backstop 20. As the endless conveyer passes the belt scraper, at least some of the coating composition that has deposited on the backstop conveyer 20 is removed therefrom and either stored for future use or returned directly to the process by direct feed, such as by a pump, to the inlet of the spray guns 30.

Notably, because the coating compositions used in the methods of the present invention are radiation curable, it is important that backstop 20 be disposed in an area wherein the backstop will not be exposed to conditions that will cure the composition. This allows the coating composition to be removed from the backstop without having cured. Moreover, because the coating compositions used in the methods of the present invention are recyclable, the composition can be removed from the backstop and reused without detrimental effect on the coating properties.

As previously indicated, in the embodiment depicted in FIG. 1, the vertically oriented article 10 is hung from an endless overhead conveyer 40, which transports the article 10 past the spray guns 30 and into and through a subsequently disposed radiation cure oven (not shown). In certain embodiments, prior to transporting the article into and through the radiation cure oven, the endless conveyer 40 first passes the vertically disposed article past a second plurality of spray guns (not shown in FIG. 1).

This arrangement allows for both sides of the vertically oriented article 10 to be coated prior to entry into and through the radiation cure oven. In certain embodiments, the second plurality of spray guns is disposed in generally the same configuration as shown by FIG. 1, with the vertically oriented article simply being rotated 180 degrees prior to passing by the spray gun, thereby ensuring that the opposite side of the article is coated. In other embodiments, the article is not rotated, but the second plurality of spray guns is disposed in generally the opposite configuration to that depicted in FIG. 1.

In these embodiments, a second backstop may be used, or, if desired, the same backstop depicted in FIG. 1 may travel along with the vertically oriented article as it passes by the second plurality of spray guns. In either case, the coating composition that deposits on either the second backstop or the traveling first backstop from the second plurality of spray guns is also removed and reused as described herein.

Once the vertically oriented article 10 is coated as desired, the article is then conveyed into and through a radiation cure oven, wherein the article is subjecting to ionizing irradiation or actinic radiation to cure the radiation-curable composition. As used herein, the term "ionizing irradiation", refers to high energy radiation and/or the secondary energies resulting from conversion of electrons or other particle energy to X-rays or gamma radiation. While various types of irradiation are suitable for this purpose, such as X-ray and gamma rays, the radiation produced by accelerated high energy electrons can sometimes be particularly suitable. However, regardless of the type of radiation and the type of equipment used for its generation or application, the use thereof in the practice of the invention as described herein is contemplated as falling within the scope of this invention so long as the ionization radiation is equivalent to at least 100,000 electron volts.

While there is no upper limit to the electron energy that can be so applied advantageously, it is believed that the effects desired in the practice of this invention can be accomplished without having to go to above 20,000,000 electron volts. Generally, the higher the electron energy used, the greater is the depth of penetration into the massive structure of the materials to be treated. For other types of radiation, such as gamma and X-rays, energy systems equivalent to the above range of electron volts are often desirable.

As used herein, the term "irradiation" includes what has been referred to in the prior art as "ionizing radiation" which has been defined as radiation possessing an energy at least sufficient to produce ions or to break chemical bonds and thus includes also radiations such as "ionizing particle radiation" as well as radiations of the type termed "ionizing electromagnetic radiation". The term "ionizing particle radiation" has been used to designate the emission of electrons or highly accelerated nuclear particles such as protons, neutrons, alpha-particles, deuterons, beta-particles, or their analogs, directed in such a way that the particle is projected into the mass to be irradiated. Charged particles can be accelerated by the aid of voltage gradients by such devices as accelerators with resonance chambers, Van der Graaff generators, betatrons, synchrotons, cyclotrons, etc. Neutron radiation can be produced by bombarding a selected light metal, such as beryllium, with positive particles of high energy. Particle radiation can also be obtained by the use of an atomic pile, radioactive isotopes or other natural or synthetic radioactive materials.

"Ionizing electromagnetic irradiation" is produced when a metallic target, such as tungsten, is bombarded with electrons of suitable energy. This energy is conferred to the electrons by potential accelerators of over 0.1 million electron volts. In addition to irradiation of this type, commonly called X-ray, an ionizing electromagnetic irradiation suitable for the practice of this invention can be obtained by means of a nuclear reactor (pile) or by the use of natural or synthetic radioactive material, for example, cobalt 60.

Various types of high power electron linear accelerators are commercially available and are described in, for example, U.S. Pat. No. 2,763,609 and in British Pat. No. 762,953.

The amount of ionizing irradiation employed can range, for example, from 0.2 megarad to 20 megarads, such as between 0.2 megarad and 10 megarads, at, for example, 150 to 300 kiloelectron volts, such as 170 to 250 kiloelectron volts. A "rad" is defined as that amount of radiation required to supply 100 ergs per gram of material being treated, and a "megarad" is 106 rads. The total dosage is the total amount of irradiation received by the material.

As used herein, the term "actinic radiation" refers to actinic light, such as ultraviolet light. Any suitable source which emits ultraviolet light having a wavelength of 180 to 400 nanometers may be used in the practice of the present invention. Suitable sources are mercury vapor lamps, carbon arcs, low pressure mercury vapor lamps, medium pressure mercury vapor lamps, high pressure mercury vapor lamps, swirl-flow plasma arcs, ultraviolet light emitting diodes and ultraviolet light emitting lasers.

The time of exposure to ultraviolet light and the intensity of the ultraviolet light to which the coating composition is exposed may vary greatly. Generally, the exposure to ultraviolet light should continue until either the film is thermoset throughout or at least cured to the point where subsequent reactions cause the film to thermoset throughout. The appropriate time of exposure and intensity of ultraviolet light used can be determined by those skilled in the art.

As will be appreciated by the foregoing description, the present invention is also directed to systems for coating a substrate. The system comprises: (a) a vertically oriented substrate disposed between a vertically oriented backstop and a spray gun; (b) a substantially 100% solids, radiation curable liquid coating composition in communication with the spray gun such that the coating composition to passes through the spray gun wherein the composition is atomized; whereby upon atomization a portion of the atomized coating composition deposits on the vertically oriented substrate and a portion of the atomized coating composition deposits on the vertically oriented backstop; (c) means for exposing the coated substrate to ionizing radiation and/or actinic radiation to cure the coating composition deposited thereon; and (d) means for removing and reusing at least a portion of the coating composition deposited on the vertically oriented backstop.

Whereas particular embodiments of this invention have been described above for purposes of illustration, it will be evident to those skilled in the art that numerous variations of the details of the present invention may be made without departing from the invention as defined in the appended claims.

We claim:

1. A method for coating a substrate, comprising:
   (a) vertically orienting the substrate between a vertically oriented backstop and a spray gun;
   (b) at least partially coating the vertically oriented substrate with a substantially 100% solids, radiation curable liquid coating composition by passing the composition through the spray gun wherein the composition is atomized; whereby a portion of the atomized coating composition deposits on the vertically oriented substrate and a portion of the atomized coating composition deposits on the vertically oriented backstop;

(c) exposing the coated substrate to ionizing radiation and/or actinic radiation to cure the coating composition deposited thereon; and (d) removing and reusing at least a portion of the coating composition deposited on the vertically oriented backstop, and (e) wherein the vertically oriented backstop comprises an endless conveyer and as the endless conveyer passes a belt scraper at least some of the coating composition that has deposited on the conveyer is removed therefrom.

2. The method of claim 1, wherein the substrate comprises cellulosic-containing material.

3. The method of claim 1, wherein the vertically oriented substrate is disposed at an angle with the horizontal of between 85 and 95 degrees.

4. The method of claim 1, wherein the coating composition is recyclable.

5. The method of claim 1, wherein the coating composition exhibits a weight loss as measured by thermogravimetric analysis of less than 10% at 120° F. for 12 hours.

6. The method of claim 1, wherein the coating composition comprises a mixture of:
(a) an acrylated epoxy, and
(b) at least one multi-functional acrylate.

7. The method of claim 6, wherein the coating composition comprises a material containing an amino group.

8. The method of claim 1, wherein the coating composition is substantially free of monofunctional reactive diluents.

9. The method of claim 6, wherein the acrylated epoxy has a viscosity at 25° C. of less than 10,000 centipoise.

10. The method of claim 7, wherein the coating composition comprises an amine modified (meth)acrylate.

11. The method of claim 1, wherein the coating composition has a viscosity of from 2 to 300 centipoise at high shear at 25° C.

12. The method of claim 1, wherein the vertically oriented substrate is continuously advanced.

13. The method of claim 1, wherein the substrate is vertically oriented by hanging the substrate from an endless overhead conveyer.

14. The method of claim 13, wherein the endless conveyer transports the article past the spray guns and into and through a radiation cure oven wherein the substrate is exposed to ionizing radiation or actinic radiation.

15. The method of claim 1, wherein the vertically oriented substrate passes by a second spray gun to coat an opposite side of the substrate prior to exposing the substrate to ionizing radiation or actinic radiation.

* * * * *